United States Patent
Arbjerg et al.

(10) Patent No.: US 10,611,402 B2
(45) Date of Patent: Apr. 7, 2020

(54) HYDRAULIC STEERING UNIT

(71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 197 days.

(21) Appl. No.: 15/970,255

(22) Filed: May 3, 2018

(65) Prior Publication Data

US 2018/0319429 A1    Nov. 8, 2018

(30) Foreign Application Priority Data

May 8, 2017   (DE) .......................... 10 2017 109 794

(51) Int. Cl.
 *B62D 5/065*   (2006.01)
 *B62D 5/093*   (2006.01)
 (Continued)

(52) U.S. Cl.
 CPC .............. *B62D 5/065* (2013.01); *B62D 5/08* (2013.01); *B62D 5/093* (2013.01); *B62D 5/14* (2013.01)

(58) Field of Classification Search
 CPC ................................ B62D 5/065; B62D 5/093
 See application file for complete search history.

(56) References Cited

U.S. PATENT DOCUMENTS

| 4,676,334 A | 6/1987 | Nakamura et al. |
| 4,958,493 A | 9/1990 | Schutten et al. |

(Continued)

FOREIGN PATENT DOCUMENTS

| DE | 102005011526 A1 | 10/2006 |
| DE | 102006010697 A1 | 9/2007 |

(Continued)

OTHER PUBLICATIONS

First Examination Report for Indian Serial No. 201814007446 dated Oct. 3, 2019.

*Primary Examiner* — Kevin Hurley
(74) *Attorney, Agent, or Firm* — McCormick, Paulding & Huber PLLC

(57) ABSTRACT

A hydraulic steering unit (1) is described comprising a supply port arrangement having a pressure port (P) connected to a main flow path (2) and a tank port (T) connected to a tank flow path (3), a working port arrangement having a left working port (L) connected to a left working flow path (9) and a right working port (R) connected to a right working flow path (10), a bridge arrangement (15) of variable orifices having a first left orifice (A2L) connected to the main flow path (2) and to a left connecting point (16) at the left working flow path (9), a first right orifice (A2R) connected to the main flow path (2) and to a right connecting point (17) at the right working flow path (10), a second left orifice (A3L) connected to the left connecting point (16) at the left working flow path (9) and to the tank flow path (3), and a second right orifice (A3R) connected to the right connecting point (17) at the right working flow path (10) and to the tank flow path (3). Such a steering unit should allow for a comfortable steering. To this end reverse flow prevention means (20, 21) are arranged in at least one of the left working flow path (9) and the right working flow path (10).

16 Claims, 3 Drawing Sheets

(51) Int. Cl.
*B62D 5/08* (2006.01)
*B62D 5/14* (2006.01)

(56) References Cited

U.S. PATENT DOCUMENTS

| | | | |
|---|---|---|---|
| 5,819,532 A | 10/1998 | Wang et al. | |
| 7,497,183 B2 * | 3/2009 | Dudra | B63H 25/30 |
| | | | 114/150 |
| 9,242,668 B2 * | 1/2016 | Ennemark | B62D 5/093 |
| 9,499,247 B1 * | 11/2016 | Wiatrowski | B63H 20/12 |
| 9,550,521 B2 * | 1/2017 | Andersen | B62D 5/093 |
| 9,616,919 B2 * | 4/2017 | Arbjerg | B62D 5/093 |
| 2014/0374187 A1 | 12/2014 | Arbjerg et al. | |
| 2018/0194392 A1 * | 7/2018 | Soerensen | B62D 5/062 |

FOREIGN PATENT DOCUMENTS

| | | | | |
|---|---|---|---|---|
| DE | 102008035793 A1 * | 2/2010 | | B62D 5/09 |
| EP | 3093212 A1 | 11/2016 | | |

* cited by examiner

HYDRAULIC STEERING UNIT

CROSS-REFERENCE TO RELATED APPLICATIONS

This application claims foreign priority benefits under U.S.C. § 119 to German Patent Application No. 10 2017 109 794.5 filed on May 8, 2017, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to a left connecting point at the left working flow path, a first right orifice connected to the main flow path and to a right connecting point at the right working flow path, a second left orifice connected to the left connecting point at the left working flow path and to the tank flow path, and a second right orifice connected to the right connecting point at the right working flow path and to the tank flow path.

BACKGROUND

Such a steering unit is known, for example, from U.S. Pat. No. 4,676,334.

Such a steering unit can be used to steer a vehicle, i.e. to change the running direction of steered wheels of the vehicle. To this end a steering motor is connected to the working port arrangement. When a steering wheel or another command giving means is actuated, hydraulic fluid from the pressure port is guided to the working ports through the bridge arrangement. When, for example, the vehicle should be steered to the left, the first left orifice and the second right orifice are opened, so that hydraulic fluid enters the steering motor on one side and hydraulic fluid displaced from the steering motor flows back through the right working port and through the second right orifice to the tank port.

In some cases a secondary flow unit is connected to the working port arrangement. The secondary flow unit can supply hydraulic fluid to the working port arrangement which hydraulic fluid is not controlled by the steering unit, but by another unit which is, for example, GPS-controlled.

When the secondary flow unit supplies oil to the working port arrangement, situations can occur in which the driver feels uncomfortable.

SUMMARY

An object underlying the invention is to give a comfortable steering feeling.

This object is solved with a hydraulic steering unit as described at the outset in that reverse flow prevention means are arranged in at least one of the left working flow paths and the right working flow paths.

The reverse flow prevention means do not allow a reverse flow through the steering unit, i.e. they do not allow a flow from the working port to the bridge arrangement. In this way the steering wheel (or any other steering command means) is not affected by a reverse flow and the steering feeling is made comfortable for the driver.

In an embodiment of the invention a measuring motor is arranged in one of the working flow paths. In this way a dead band of the steering unit can be minimized.

In an embodiment of the invention the bridge is a first bridge, the orifices of the first bridge are open in neutral position, and a second bridge is arranged parallel to the first bridge, the second bridge having four variable secondary orifices which are closed in neutral position, wherein a secondary left connecting point between secondary first left orifice and secondary second left orifice is connected to the left working flow path and a secondary right connecting point between secondary first right orifice and secondary right orifice is connected to the right working flow path. As in the previous embodiments, the first bridge is in form of a Wheatstone bridge, wherein one diagonal is arranged between the main flow path and the tank flow path and the other diagonal is arranged between the two working flow paths. The second bridge is a Wheatstone bridge as well having basically the same connection points. The use of a first bridge with neutral open orifices allows steering with a higher precision.

In an embodiment of the invention the reverse flow prevention means are arranged to prevent a reverse flow through the first bridge only. When the vehicle is steered by the secondary flow unit, there is usually no need for the driver to steer the vehicle as well by the steering unit. Therefore, the first bridge can be inactivated by the reverse flow prevention means. If steering is suddenly needed, the steering can be performed by the second bridge having neutral closed orifices. These neutral closed orifices allow steering by the driver, however, with less precision.

In an embodiment of the invention the reverse flow prevention means are arranged between the left connection point and the secondary left connection point and/or between the right connection point and the secondary right connection point. This means that the reverse flow prevention means block a reverse flow to the first bridge only, but allow a reverse flow to the second bridge. Since the second bridge has neutral closed orifices, the reverse flow is stopped in the second bridge itself.

In an embodiment of the invention the reverse flow prevention means are in form of a check valve opening in a direction towards the working port arrangement. This is a rather simple solution. The check valve blocks reverse flow automatically without any further action being necessary.

In an embodiment of the invention a check valve in the left working flow path is opened by a pressure in the right working flow path and a check valve in the right working flow path is opened by a pressure in the left working flow path. In this way the check valves open automatically when the steering unit is activated by the driver.

In an embodiment of the invention the reverse flow prevention means are in form of a controlled switch valve. The controlled switch valve can be, for example, switched between two operating conditions. In one operating condition the switch valve is opened and in the other operating condition the switch valve is closed. In this way command signals are necessary. However, these command signals can be delivered by the secondary flow unit.

BRIEF DESCRIPTION OF THE DRAWINGS

Embodiments of the invention will now be described in more detail with reference to the drawing, wherein.

In all Figures the same elements are referred to with the same reference numerals.

DETAILED DESCRIPTION

Figure 1:
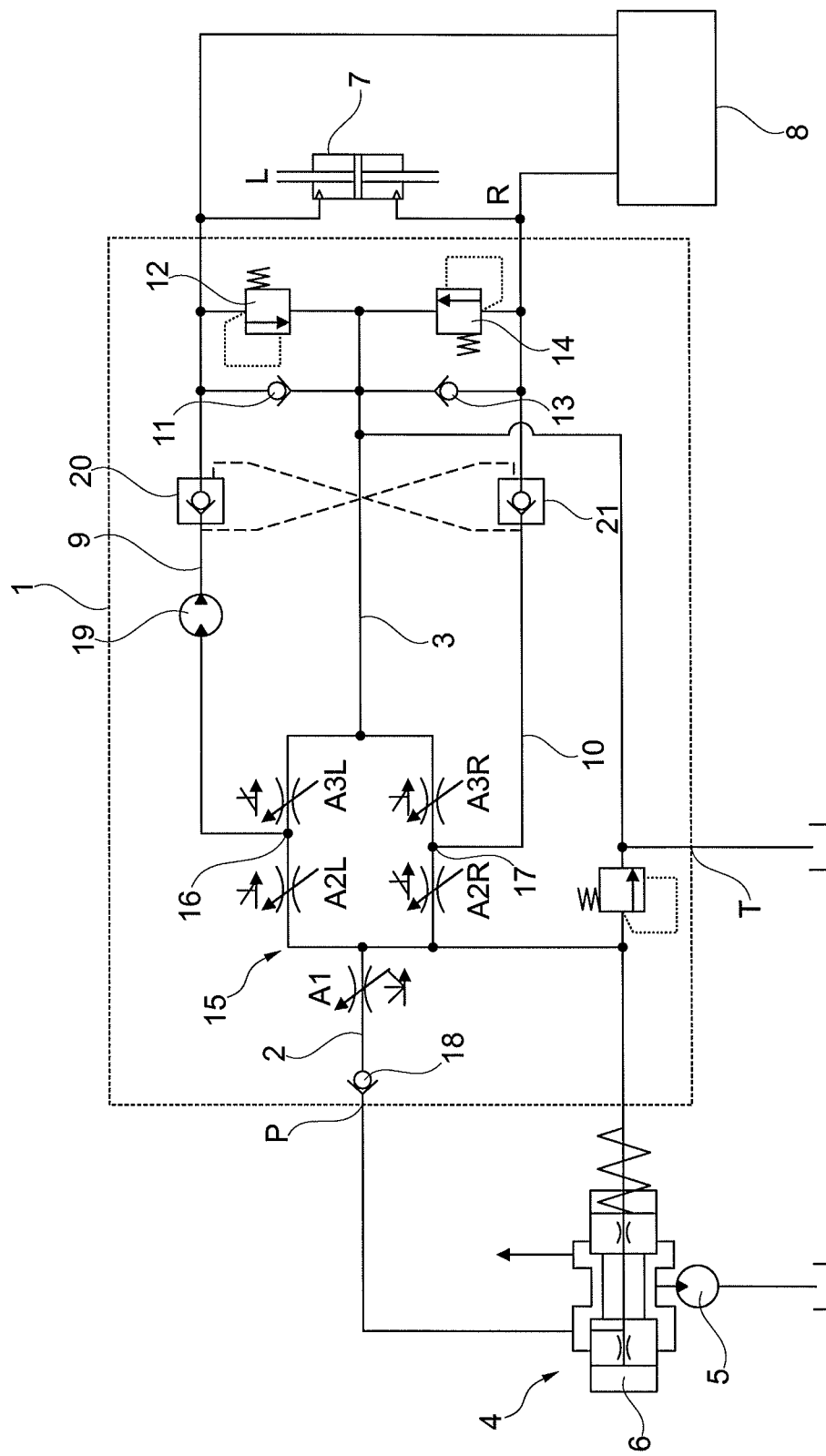
FIG. 1 shows a first embodiment of a hydraulic steering unit.

FIG. 1 shows schematically a steering unit 1 comprising a supply port arrangement having a pressure port P and a tank port T. The pressure port P is connected to a main flow path 2. The tank port T is connected to a tank flow path 3.

The pressure port P is connected to a pressure source 4 which in the present case comprises am pump 5 and a priority valve 6. However, basically any other pressure source can be used.

The steering unit 1 furthermore comprises a working port arrangement having a left working port L and a right working port R. A steering motor 7 is connected to the working port L, R.

In the present case a secondary flow unit 8 is connected to the working port arrangement L, R. The secondary flow unit 8 can, for example, use electrohydraulic valves or another hydrostatic steering component. The secondary steering unit 8 can be used, for example, for remotely steer the vehicle.

The left working port L is connected to a left working flow path 9 and the right working port R is connected to a right working flow path 10. The left working flow path 9 is connected by a check valve 11 to the tank flow path 3. Furthermore, the left working flow path 9 is connected to the tank flow path 3 by a pressure relief valve 12. The right working flow path 10 is connected to the tank flow path 3 by means of a check valve 13. Furthermore, the right working flow path 10 is connected to a tank flow path 3 by means of a pressure relief valve 14.

A bridge arrangement 15 of variable orifices (which will be explained in more detail later on) is connected to a main flow path 2 and to the tank flow path 3. Furthermore, the bridge arrangement 15 is connected to the left working flow path 9 and to the right working flow path 10.

The bridge arrangement 15 comprises a first left orifice A2L which is connected to the main flow path 2 and to the left working flow path 9. The connection to the left working flow path 9 is made at a left connecting point 16. Furthermore, the bridge arrangement 15 comprises a first right orifice A2R which is connected to the main flow path 2 and to the right working flow path 10 at a connecting point 17. The bridge arrangement 15 furthermore comprises a second right orifice A3L connected to the left connecting point 16 and to the tank flow path 3. Furthermore, the bridge arrangement 15 comprises a second right orifice A3R which is connected to the right connecting point 17 and to the tank flow path 3.

A main orifice A1 is arranged in the main flow path 2 between the pressure port P and the bridge arrangement 15. A check valve 18 opening in a direction towards the bridge arrangement 15 is arranged between the pressure port P and the main orifice A1. The main orifice A1, the first left orifice A2L, the second left orifice A3L, the first right orifice A2R, and the second right orifice A3R are neutral open orifices, i.e. they allow a small flow of hydraulic fluid in neutral position of the steering unit 1.

A measuring motor 19 is arranged in the left working flow path 9. Alternatively, the measuring motor 19 can be arranged in the right working flow path 10.

The orifices A1, A2L, A3L, A2R, A3R can be realized, for example, in a spool-sleeve arrangement. The spool-sleeve arrangement comprises a spool which is rotatably mounted in a sleeve. The set of spool and sleeve are rotatably mounted in a housing. A steering wheel or the like is connected to one of the spool and the sleeve. The measuring motor 19 is connected to the other one of the spool and the sleeve. When the steering wheel is actuated, the spool is rotated relatively to the sleeve and opens some orifices and closes some other orifices. The flow flowing through the bridge arrangement 15 drives the measuring motor 19. The measuring motor restores the spool-sleeve set to its neutral position as soon as the necessary amount of fluid has been supplied to the working port arrangement L, R.

When, for example, the steering motor 7 should be steered to the left, the first left orifice A2L and the second right orifice A3R are opened and the second left orifice A3L and the first right orifice A2R are closed. Hydraulic fluid from the pressure port P flows through the first left orifice A2L, the measuring motor 19 and the left working flow path 9 to the left working port L. Hydraulic fluid displaced from the steering motor 7 enters the steering unit 1 at the right working port R and flows back through the right working flow path 10 and the second right orifice A3R to the tank flow path 3 and from there to a tank port T.

When, however, during steering or during a neutral position of the steering unit 1 hydraulic fluid is supplied from the secondary flow unit 8, a situation can arise in which the steering wheel is turned under influence of the hydraulic fluid supplied by the secondary flow unit.

To prevent the steering wheel from being turned as a consequence of pressure changes in the steering motor 7, reverse flow prevention means are arranged in at least one of left working flow path 9 and the right working flow path 10. In an preferred embodiment these reverse flow prevention means are arranged in both working flow paths 9, 10.

In the embodiment shown in FIG. 1, the reverse flow prevention means comprise a control check valve 20 in the left working flow path and a controlled check valve 21 in the right working flow path 10. The check valve 20 in the left working flow path 9 opens in two cases. The first case is that hydraulic fluid is supplied from the pressure port P towards the left working port L. The second case is when hydraulic fluid under pressure is supplied from the pressure port P to the right working port L through the right working flow path 10. The same is true for the check valve 21 which is opened by pressure at the right connection point 17 or by a pressure in the left working flow path 9 upstream the check valve 21.

However, check valves 20, 21 do not open when only a pressure at the working ports L, R arises. In this way, the check valves 20, 21 prevent a reverse flow back to the bridge arrangement 15.

Figure 2:
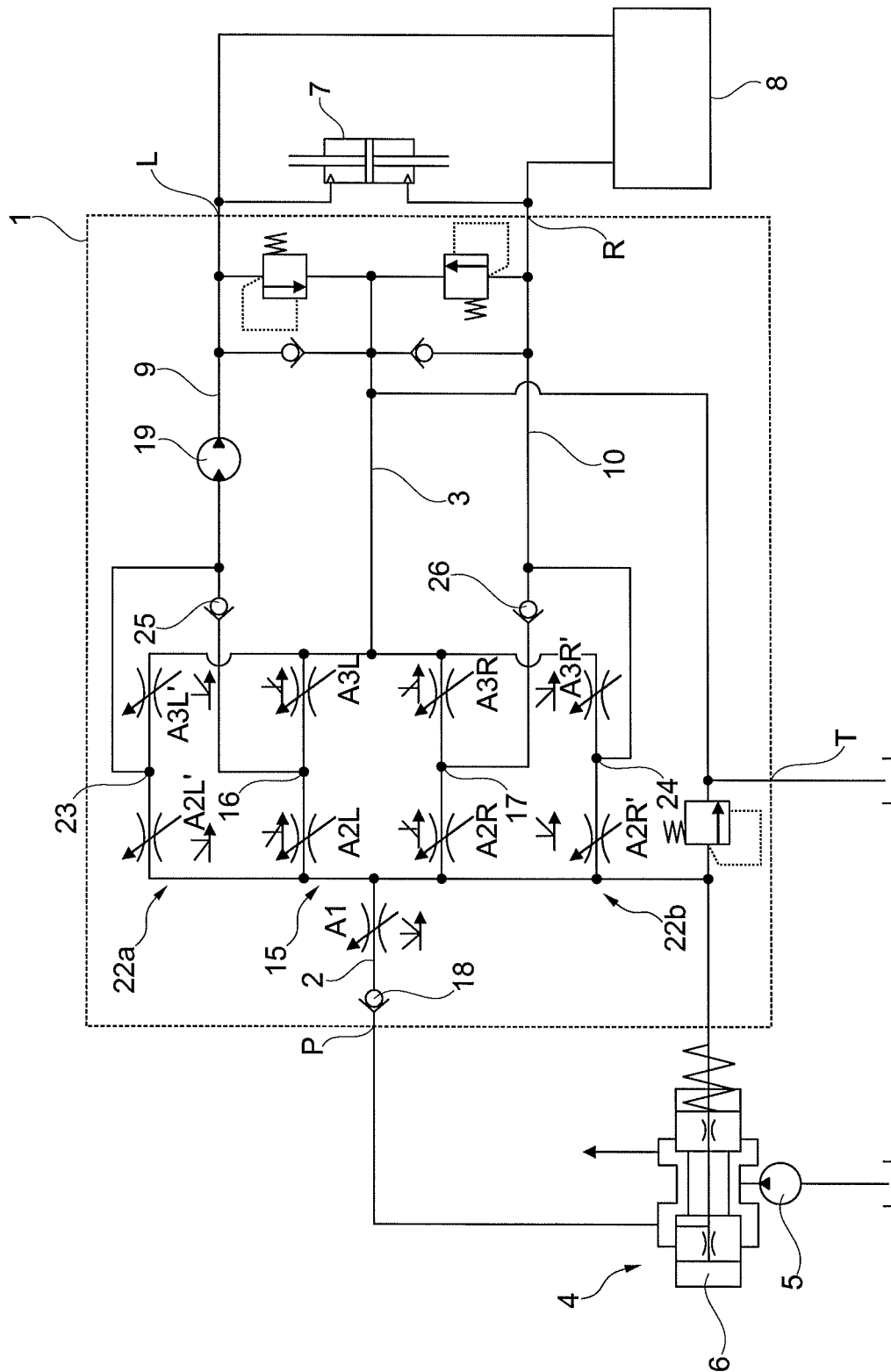
FIG. 2 shows a second embodiment of a steering unit.

FIG. 2 shows another embodiment of a steering unit 1.

Same reference numerals are used for the same elements.

The embodiment shown in FIG. 2 differs from the embodiment shown in FIG. 1 in that the bridge arrangement 15 is a first bridge having the same function and behavior as in the embodiment shown in FIG. 1. The bridge arrangement 15 comprises the above described four neutral open orifices A2L, A3L, A2R, A3R.

A second bridge 22a, 22b is arranged parallel to the first bridge, i.e. to the bridge arrangement. The second bridge is shown with a first half 22a and a second half 22b. The second bridge 22a, 22b comprises four variable secondary orifices A2L', A3L', A2R', A3R' which are closed in neutral position.

The secondary first left orifice A2L' is connected to the main flow path 2 and to the left working flow path 9. The secondary second left orifice A3L' is connected to the left working flow path 9 and to the tank flow path 3. The secondary first right orifice A2R' is connected to the main flow path 2 and to the right working flow path 10. The secondary second right orifice A3R' is connected to the right working flow path 10 and to the tank flow path 3. Consequently, the first half 22a of the second bridge comprises a secondary left connecting point 23 and the second half 22b of the second bridge comprises a secondary right connecting point 24.

In this embodiment the reverse flow prevention means comprise a first check valve 25 in the left working flow path 9 and a second check valve 2 in the right working flow path 10. However, the check valves 25, 26 block only a reverse flow into the bridge arrangement 15, i.e. into the first bridge. A reverse flow into the second bridge 22a, 22b is not possible in neutral position because the orifices A2L', A3L', A2R', A3R' of the second bridge 22a, 22b are closed in neutral position.

Therefore, any reverse flow through the measuring motor 19 is prevented.

Figure 3:
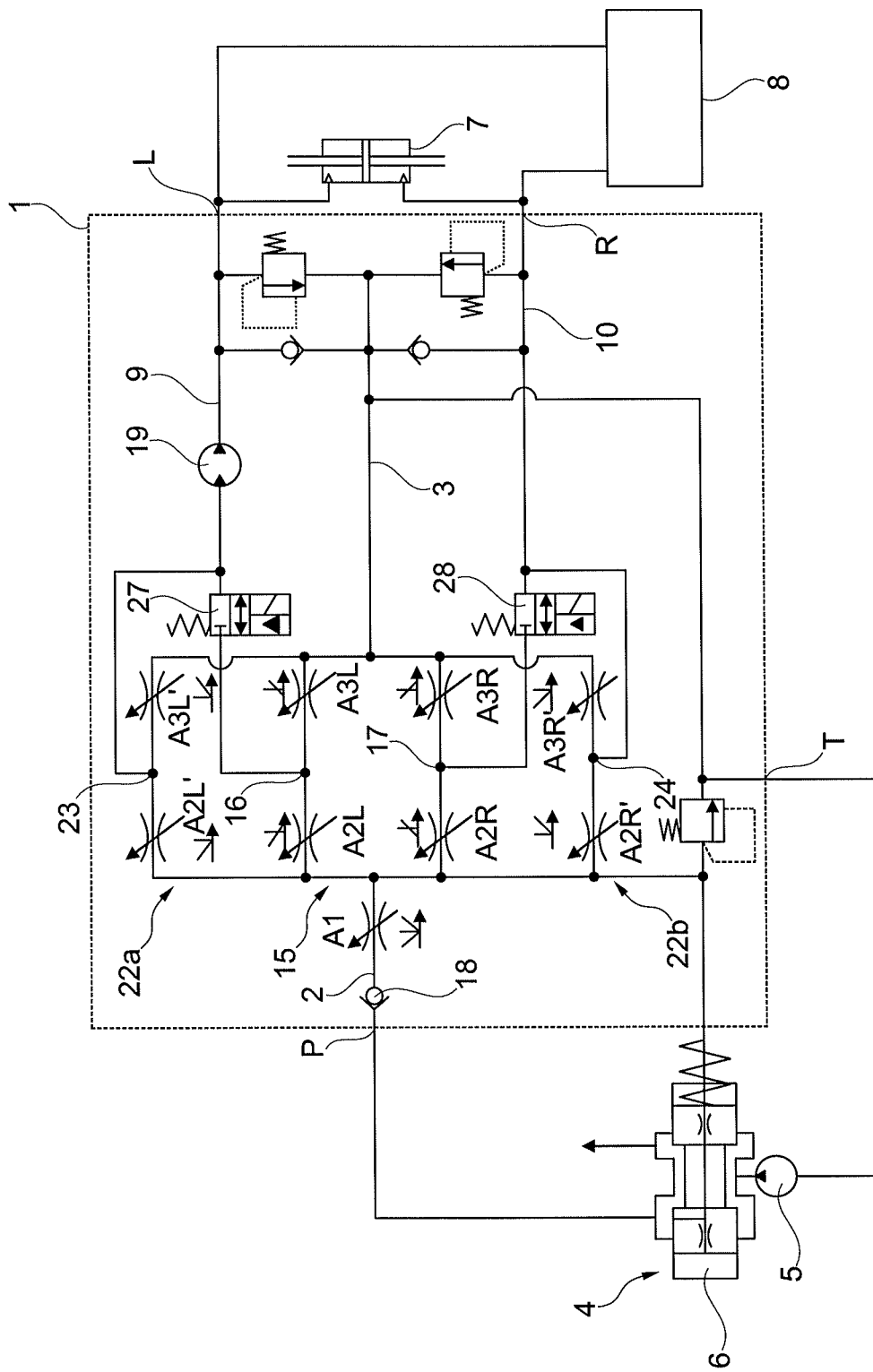
FIG. 3 shows a third embodiment of a steering unit.

FIG. 3 shows a third embodiment of the steering unit 1. In this embodiment the reverse flow prevention means are in form of a controlled switch valve 27 in the left working flow path 9 and a controlled switch valve 28 in the working flow path 10. The two switching valves 27, 28 are arranged to block a flow into the bridge arrangement 15 only. A flow into a second bridge 22a, 22b is not possible since the orifices A2L', A3L', A2R', A3R' are closed in neutral position.

The opening/closing behavior of all orifices is shown by symbols near the orifices. A vertical axis defines the neutral position. An inclined line shows an opening degree of the respective orifice.

The use of the bridge arrangement 15 with open neutral orifices has the advantage that steering out of the neutral position can be made very smooth. However, this bridge arrangement 15 does not prevent reverse flow by its own.

The second bridge 22a, 22b allows steering. However, the steering with neutral closed orifices is at least at the beginning not so comfortable.

A main orifice A1 is arranged in the main flow path 2. The main orifice A1 is a neutral open orifice. It limits in the neutral condition of the steering unit 1 the flow of fluid into the bridge arrangement 15 and into the second bridge 22a, 22b.

In a way not shown, a tank orifice can be arranged in the tank flow path 3. Furthermore, it is possible to arrange third variable orifices in the left working flow path 9 and in the right working flow path 10.

The tank orifice in the tank flow path 3 and the third orifices in the working flow paths 9, 10 can be closed in neutral position. However, they open rather fast, when the steering unit is actuated.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port (P) connected to a main flow path and a tank port (T) connected to a tank flow path, a working port arrangement having a left working port (L) connected to a left working flow path and a right working port (R) connected to a right working flow path, a bridge arrangement of variable orifices having a first left orifice (A2L) connected to the main flow path and to a left connecting point at the left working flow path, a first right orifice (A2R) connected to the main flow path and to a right connecting point at the right working flow path, a second left orifice (A3L) connected to the left connecting point at the left working flow path and to the tank flow path, and a second right orifice (A3R) connected to the right connecting point at the right working flow path and to the tank flow path, wherein reverse flow prevention means are arranged in at least one of the left working flow path and the right working flow path.

2. The hydraulic steering unit according to claim 1, wherein a measuring motor is arranged in one of the working flow paths.

3. The hydraulic steering unit according to claim 2, wherein the bridge arrangement is a first bridge, the orifices (A2L, A3L, A2R, A3R) of the first bridge are open in neutral position, and a second bridge is arranged parallel to the first bridge, the second bridge having four variable secondary orifices (A2L', A3I', A2R', A3R') which are closed in neutral position, wherein a secondary left connecting point between secondary first left orifice (A2L') and secondary second left orifice (A3L') is connected to the left working flow path and a secondary right connecting point between secondary first right orifice (A2R') and secondary second right orifice (A3R') is connected to the right working flow path.

4. The hydraulic steering unit according to claim 3, wherein the reverse flow prevention means are arranged to prevent a reverse flow through the first bridge only.

5. The hydraulic steering unit according to claim 4, wherein the reverse flow prevention means are arranged between the left connection point and the secondary left connection point and/or between the right connection point and the secondary right connection point.

6. The hydraulic steering unit according to claim 1, wherein the reverse flow prevention means are in form of a check valve opening in a direction towards the working port arrangement (L, R).

7. The hydraulic steering unit according to claim 6, wherein a check valve in the left working flow path is opened by a pressure in the right working flow path and a check valve in the right working flow path is opened by a pressure in the left working flow path.

8. The hydraulic steering unit according to claim 1, wherein the reverse flow prevention means are in form of a controlled switch valve.

9. The hydraulic steering unit according to claim 2, wherein the reverse flow prevention means are in form of a check valve opening in a direction towards the working port arrangement (L, R).

10. The hydraulic steering unit according to claim 3, wherein the reverse flow prevention means are in form of a check valve opening in a direction towards the working port arrangement (L, R).

11. The hydraulic steering unit according to claim 4, wherein the reverse flow prevention means are in form of a check valve opening in a direction towards the working port arrangement (L, R).

12. The hydraulic steering unit according to claim 5, wherein the reverse flow prevention means are in form of a check valve opening in a direction towards the working port arrangement (L, R).

13. The hydraulic steering unit according to claim 2, wherein the reverse flow prevention means are in form of a controlled switch valve.

14. The hydraulic steering unit according to claim 3, wherein the reverse flow prevention means are in form of a controlled switch valve.

15. The hydraulic steering unit according to claim 4, wherein the reverse flow prevention means are in form of a controlled switch valve.

16. The hydraulic steering unit according to claim 5, wherein the reverse flow prevention means are in form of a controlled switch valve.

\* \* \* \* \*